United States Patent
Kuan et al.

(10) Patent No.: US 8,752,343 B2
(45) Date of Patent: Jun. 17, 2014

(54) SOLAR APPARATUS AND MOUNTING SYSTEM THEREOF

(71) Applicant: AU Optronics Corporation, Hsin-Chu (TW)

(72) Inventors: Hao-Hung Kuan, Hsin-Chu (TW); Tung-I Yen, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 0 days.

(21) Appl. No.: 13/834,829

(22) Filed: Mar. 15, 2013

(65) Prior Publication Data
US 2014/0069484 A1 Mar. 13, 2014

(30) Foreign Application Priority Data

Sep. 13, 2012 (CN) .......................... 2012 1 0337766

(51) Int. Cl.
*E04D 13/08* (2006.01)
(52) U.S. Cl.
USPC .................. 52/173.3; 52/27; 52/58; 248/237
(58) Field of Classification Search
CPC ............. E04H 14/00; E04C 2/52; E04C 2/00; E04B 7/18; E04G 23/00
USPC .............. 52/173.3, 656.1, 653.1, 582.1, 698, 52/700, 475.1, 58; 126/621, 623, 704, 126/600; 136/244, 230, 251; 248/127, 148, 248/154, 188.1, 237, 351, 357, 633, 910, 248/346.01, 678
See application file for complete search history.

(56) References Cited

U.S. PATENT DOCUMENTS

| | | | | |
|---|---|---|---|---|
| 5,056,750 A * | 10/1991 | Ellithorpe | ................... | 248/354.3 |
| 5,445,352 A * | 8/1995 | Long | .......................... | 248/354.5 |
| 5,603,187 A * | 2/1997 | Merrin et al. | ..................... | 52/58 |
| 5,819,482 A * | 10/1998 | Belke et al. | .................. | 52/126.6 |
| 6,046,399 A * | 4/2000 | Kapner | ......................... | 136/244 |
| 7,435,134 B2 * | 10/2008 | Lenox | ........................... | 439/567 |
| 7,435,897 B2 * | 10/2008 | Russell | ......................... | 136/244 |
| 2003/0015637 A1* | 1/2003 | Liebendorfer | ................ | 248/237 |
| 2008/0087275 A1* | 4/2008 | Sade et al. | ..................... | 126/623 |
| 2010/0175337 A1* | 7/2010 | Mascolo et al. | ............. | 52/173.3 |
| 2010/0236155 A1* | 9/2010 | Lanza | ............................... | 52/58 |
| 2010/0236162 A1* | 9/2010 | Tweedie | ....................... | 52/127.6 |
| 2011/0214368 A1* | 9/2011 | Haddock et al. | ............. | 52/173.3 |

FOREIGN PATENT DOCUMENTS

| | | |
|---|---|---|
| BE | 898560 A1 | 6/1984 |
| CN | 2287256 Y | 8/1998 |
| CN | 2604254 Y | 2/2004 |
| CN | 201690385 U | 12/2010 |
| CN | 102290470 A | 12/2011 |
| TW | M396947 | 1/2011 |

* cited by examiner

*Primary Examiner* — Brian Glessner
*Assistant Examiner* — Beth Stephan
(74) *Attorney, Agent, or Firm* — WPAT, PC; Justin King

(57) ABSTRACT

A solar apparatus includes a solar panel, a frame body surrounding an edge of the solar panel, a first Y-shaped support, and a second Y-shaped support. The first Y-shaped support has two parallel first extending arms and a first supporting portion. The first supporting portion is connected to the two first extending arms, and one of the two first extending arms is fixed on a side of the frame body. The second Y-shaped support has two parallel second extending arms and a second supporting portion. The second supporting portion is connected to the two second extending arms, and one of the two second extending arms is fixed on the side of the frame body. A height of the first Y-shaped support is smaller than a height of the second Y-shaped support.

18 Claims, 16 Drawing Sheets

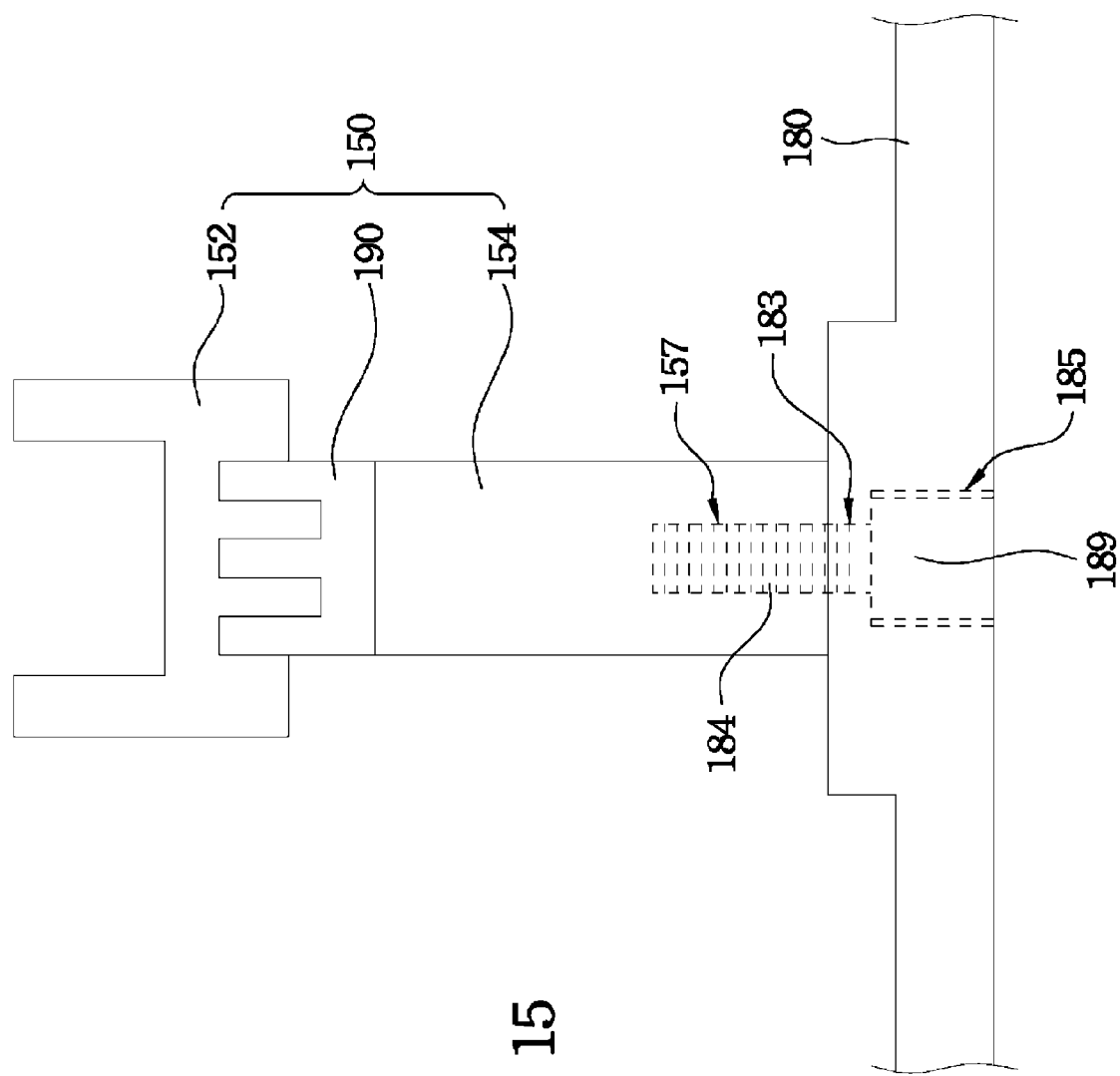

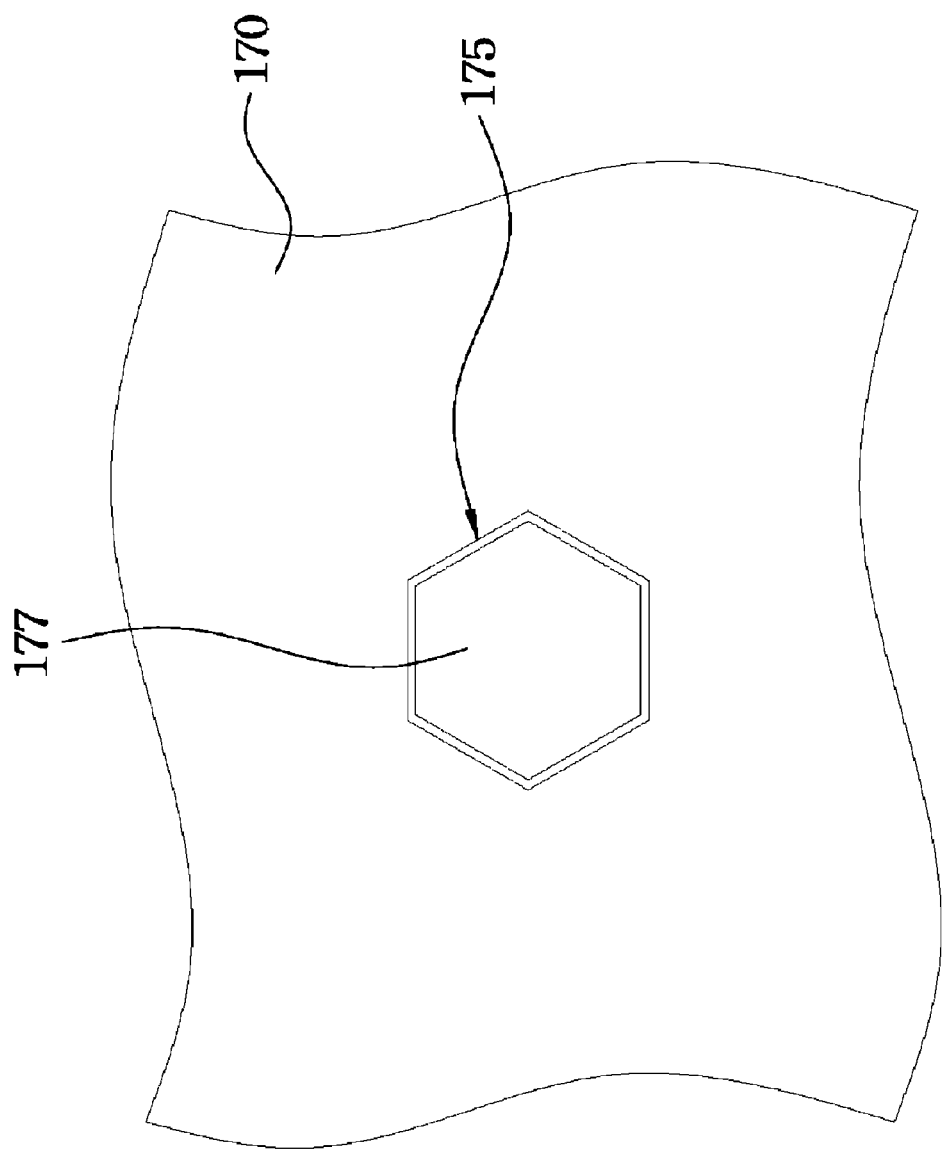

SOLAR APPARATUS AND MOUNTING SYSTEM THEREOF

RELATED APPLICATIONS

This application claims priority to China Application Serial Number 201210337766.X, filed Sep. 13, 2012, which is herein incorporated by reference.

BACKGROUND

1. Technical Field

The present disclosure relates to a solar apparatus and a mounting system thereof.

2. Description of Related Art

Solar panels can convert light energy (typically sunlight) into electrical energy without producing any greenhouse gases during the conversion process. Therefore, solar modules are an environmentally friendly way to generate electrical energy.

With the progress and development in photovoltaic technology in recent years, the cost of solar modules has gone down, and this has lead to an increase in the popularity of solar modules in the consumer market. For example, solar modules are now widely used on the rooftops of homes and buildings, as well as in various electronic products.

A conventional solar assembly arranged on a rooftop of a building typically includes a solar cell and a support base. The support base is fixed on a surface of the rooftop, and the solar cell is arranged on the support base. The support base can be designed to correspond to an angle that light shines on the solar cell, such that an included angle is formed between the solar cell and the surface of the rooftop. As a result, the solar cell is obliquely arranged on the surface of the rooftop, thereby allowing direct sunlight to shine on the solar cell for a greater length of time. Therefore, the photoelectric conversion efficiency of the solar cell can be improved.

However, there is a large number of connection structures between the solar cell and the support base, and moreover, such connection structures are complex and are not easily packaged for transport. Additionally, when the support base and the solar cell are assembled, many tools, as well as much time and manpower are needed, thereby causing difficulties for assembly staff. Moreover, the connection structures sold by different manufactures can only be used for specific types of solar cells, and not universally for a number of different types of solar cell. Finally, when a solar cell needs to be grounded, additional conductive wires are often used to connect to an external frame of the solar cell, and such a configuration further increases assembly difficulty.

SUMMARY

An aspect of the present invention is to provide a solar apparatus.

In an embodiment of the present invention, a solar apparatus includes a solar panel, a frame body surrounding an edge of the solar panel, a first Y-shaped support, and a second Y-shaped support. The first Y-shaped support has two parallel first extending arms and a first supporting portion. The first supporting portion is connected to the two first extending arms, and one of the two first extending arms is fixed on a side of the frame body. The second Y-shaped support has two parallel second extending arms and a second supporting portion. The second supporting portion is connected to the two second extending arms, and one of the two second extending arms is fixed on the side of the frame body. A height of the first Y-shaped support is smaller than a height of the second Y-shaped support.

Another aspect of the present invention is to provide a solar mounting system suitable for supporting a solar module.

In an embodiment of the present invention, a solar mounting system includes a first Y-shaped support, a first base plate, a second Y-shaped support, and a second base plate. The first Y-shaped support has two parallel first extending arms and a first supporting portion. The first supporting portion is connected to the two first extending arms, and one of the two first extending arms is fixed to the solar module. The first Y-shaped support is fixed on the first base plate. The second Y-shaped support has two parallel second extending arms and a second supporting portion. The second supporting portion is connected to the two second extending arms, and one of the two second extending arms is used to fix the solar module. A height of the first Y-shaped support is smaller than a height of the second Y-shaped support. The second Y-shaped support is fixed on the second base plate.

In the aforementioned embodiments of the present invention, since one of the first extending arms can be fixed on a side of the frame body, and one of the second extending arms can also be fixed on the side of the frame body, the solar panel located in the frame body can be supported by the first and second Y-shaped supports. Through this and other structures of the present invention, the solar mounting system can be easily assembled and disassembled without the use of a large number of tools and connection structures. Furthermore, the first and second Y-shaped supports are easily packaged for transport, and can be connected to frame bodies of different types of solar cells. Hence, assembly and disassembly time can be reduced, as can material and labor costs.

BRIEF DESCRIPTION OF THE DRAWINGS

FIG. 15 is a schematic view of the second Y-shaped support shown in FIG. 1 and FIG. 10 when assembled to a second base plate; and FIG. 16 is a bottom view of the first Y-shaped support shown in FIG. 14 when assembled to the first base plate.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
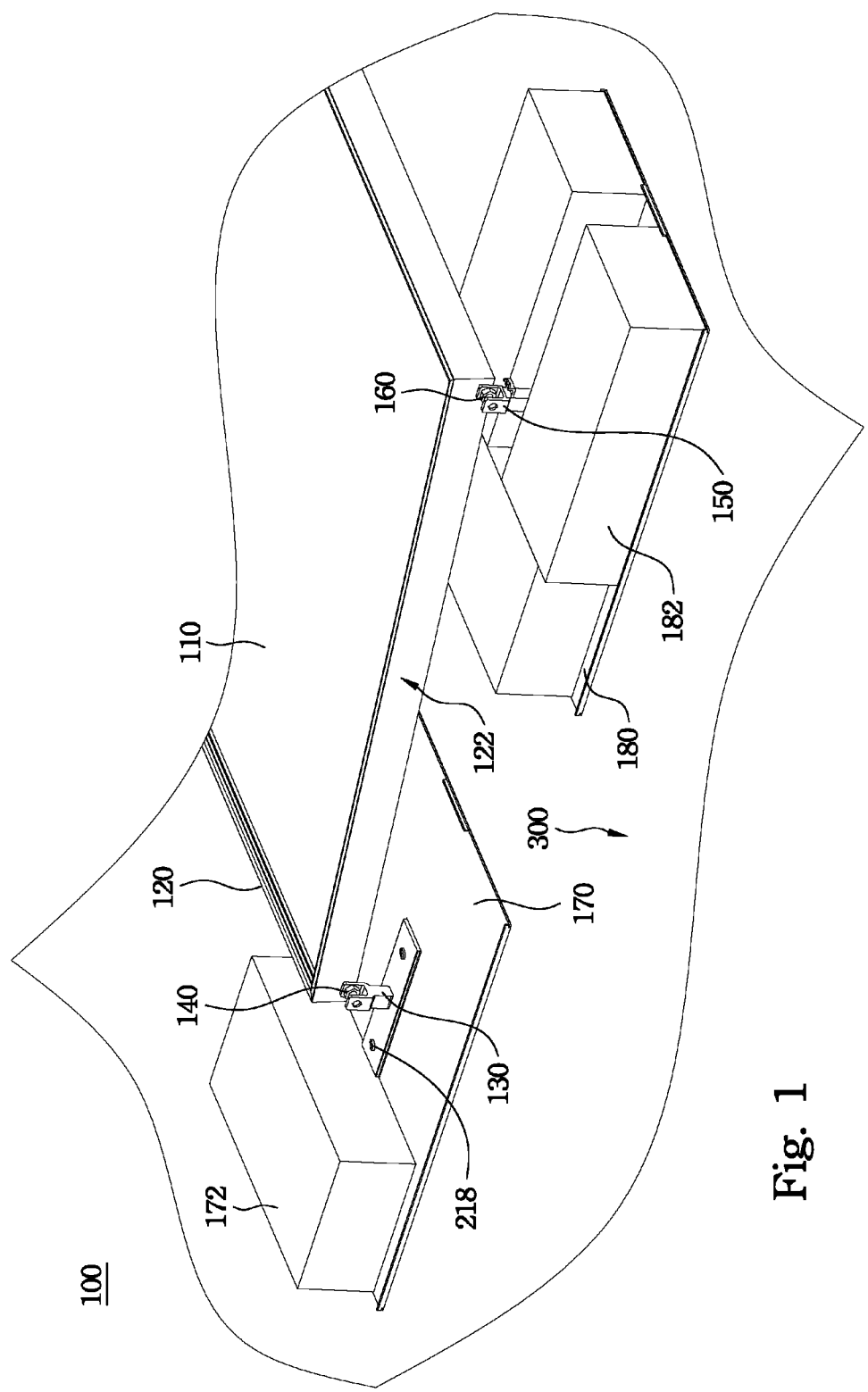
FIG. 1 is a perspective view of a solar apparatus according to an embodiment of the present invention.

FIG. 1 is a perspective view of a solar apparatus 100 according to an embodiment of the present invention. As shown in FIG. 1, the solar apparatus 100 includes a solar module and a mounting system thereof. The solar module includes a solar panel 110 and a frame body 120. The mounting system includes a first Y-shaped support 130, a first fixing element 140, a second Y-shaped support 150, and a second fixing element 160. The frame body 120 surrounds an edge of the solar panel 110, and is supported by the first and second Y-shaped supports 130, 150. The frame body 120 is connected to the first Y-shaped support 130 by the first fixing element 140, and to the second Y-shaped support 150 by the second fixing element 160. Furthermore, the first and second Y-shaped supports 130, 150 may be made of a material that includes aluminum or an aluminum alloy. The first and second Y-shaped supports 130, 150 may be manufactured by stamping or aluminum extrusion. However, the present invention is not limited in this regard, and other materials and manufacturing methods may be used for the first and second Y-shaped supports 130, 150 as deemed necessary by designers.

In this embodiment, the mounting system of the solar apparatus 100 may further include a first base plate 170, a second base plate 180, and pressing blocks 172, 182. The first Y-shaped support 130 is fixed on the first base plate 170, and the second Y-shaped support 150 is fixed on the second base plate 180. The pressing blocks 172, 182 are respectively placed on the first and second base plates 170, 180, such that the first and second base plates 170, 180 can be firmly located on a support surface 300 (e.g., a rooftop surface or a ground surface), and the solar panel 110 and the frame body 120 do not easily undergo displacement caused by external forces (e.g., a wind force). The number of the pressing blocks 172, 182 may be varied depending on the magnitude of such external forces at the location where the solar apparatus 100 is placed. Furthermore, the first and second base plates 170, 180 can be fixed on the support surface 300 by using screws 218 or an adhesive. For example, each of the first and second base plates 170, 180 may have a fixing hole 179 (see FIG. 2), such that a screw 218 can be inserted through the fixing hole 179 and engaged with a screw hole (not shown) in the support surface 300 to thereby fix the first base plate 170 on the support surface 300. The pressing blocks 172, 182 may be cement blocks or bricks, but the present invention is not limited in this regard.

Moreover, heights of the first and second Y-shaped supports 130, 150 can be designed to optimize the reception of sunlight. That is, when the heights of the first and second Y-shaped supports 130, 150 are different, the solar panel 110 can be obliquely arranged on the support surface 300. As a result, the solar panel 110 can receive more sunlight, such that the photoelectric conversion efficiency of the solar panel 110 can be improved. In this embodiment, the height H1 (see FIG. 3) of the first Y-shaped support 130 is smaller than the height H2 (see FIG. 5) of the second Y-shaped support 150, such that the solar panel 110 can be obliquely arranged on the support surface 300.

In the following description, the structures of and the manner of connection among the components of the solar apparatus 100 will be described in detail.

Figure 2:
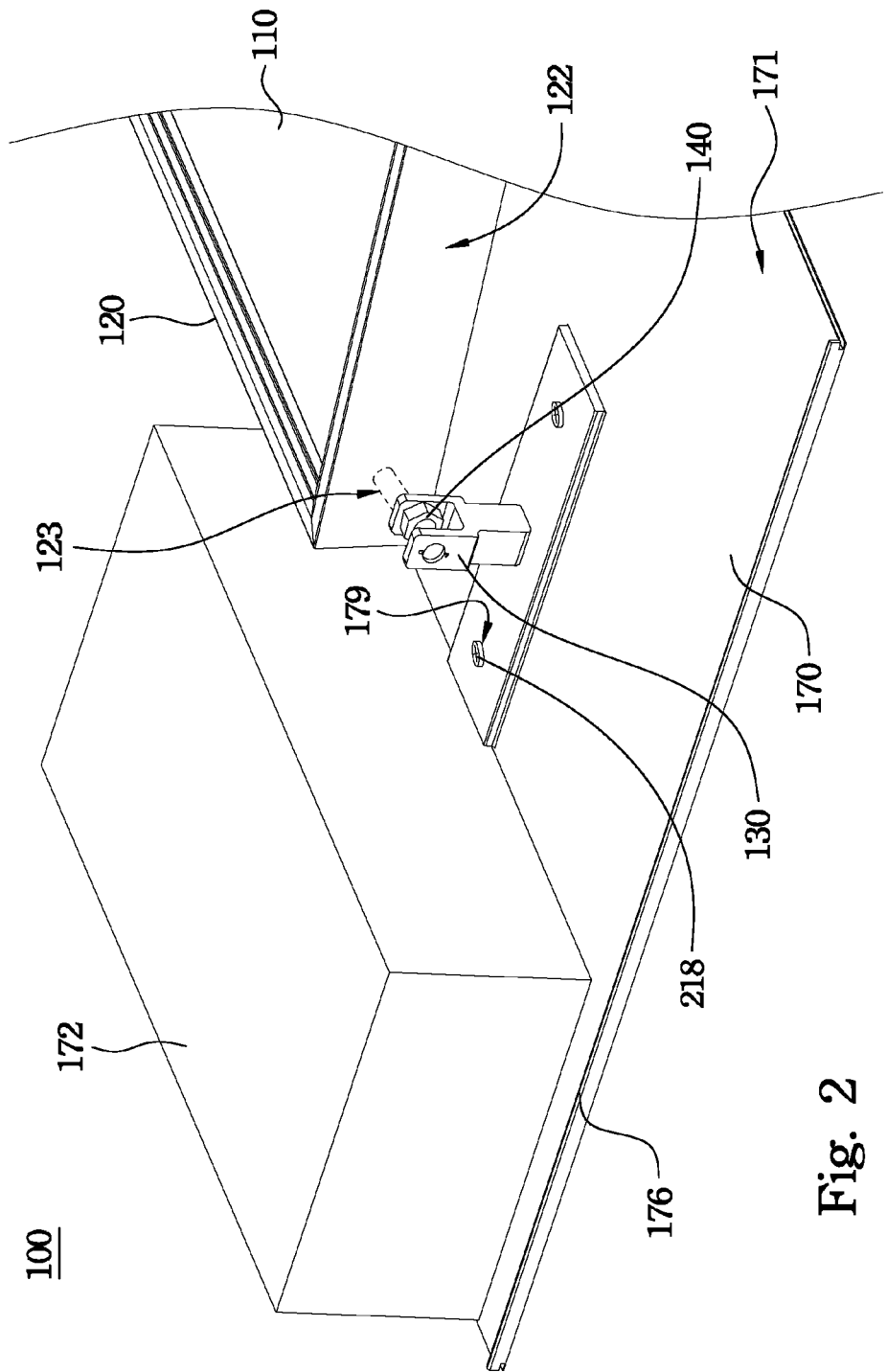
FIG. 2 is a partial enlarged view of the solar apparatus shown in FIG. 1.
Figure 3:
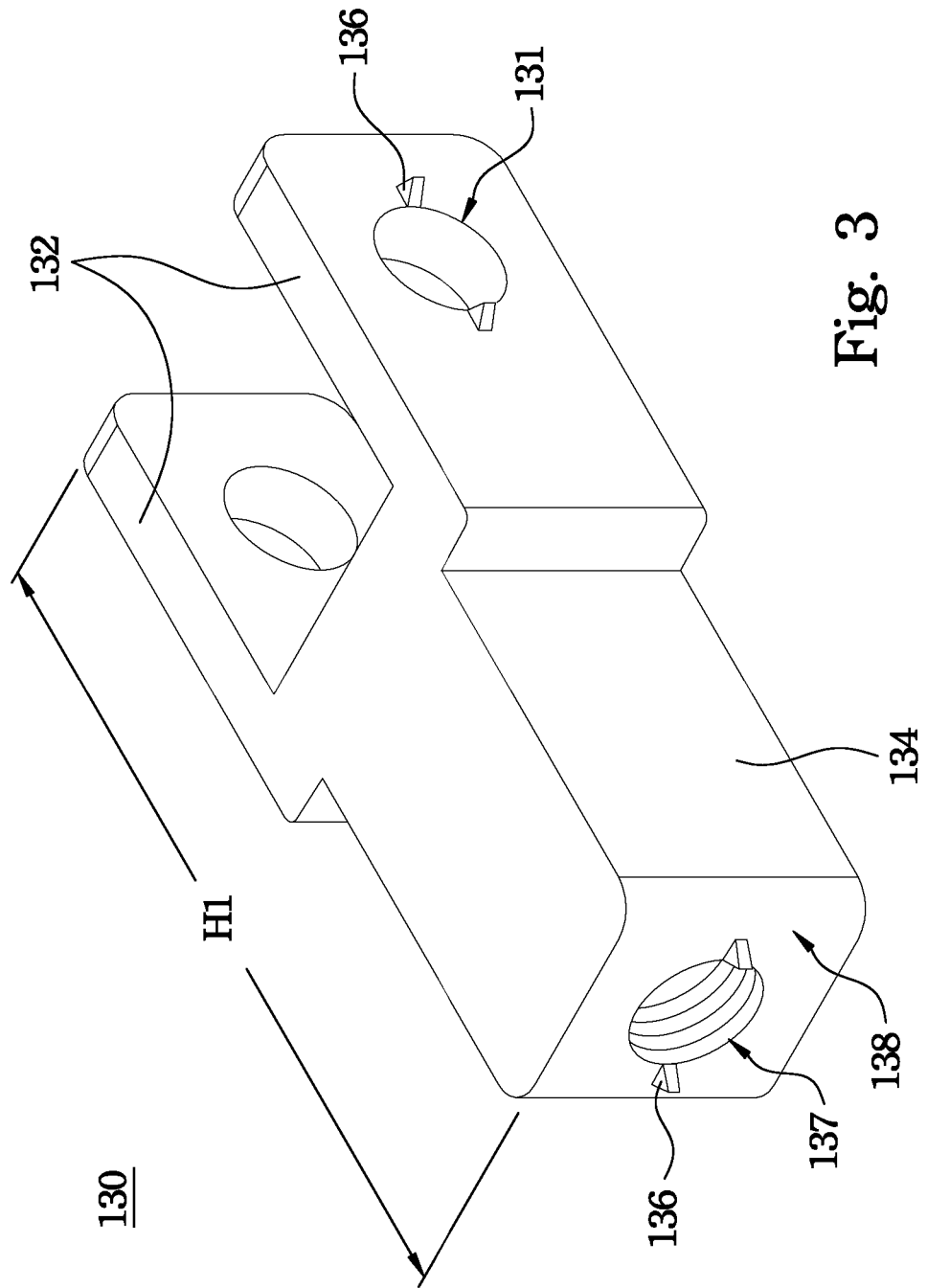
FIG. 3 is a perspective view of a first Y-shaped support shown in FIG. 2.

FIG. 2 is a partial enlarged view of the solar apparatus 100 shown in FIG. 1. FIG. 3 is a perspective view of the first Y-shaped support 130 shown in FIG. 2. As shown in FIG. 2 and FIG. 3, a side face 122 of the frame body 120 has a first concave hole 123. The first Y-shaped support 130 has two substantially parallel first extending arms 132 and a first supporting portion 134 connected to the two first extending arms 132, and the first base plate 170 has a first surface 171. A bottom end surface 138 of the first supporting portion 134 of the first Y-shaped support 130 is connected to the first surface 171. The first surface 171 is used to support the pressing block 172. It is to be noted that "substantially" used herein may refer to variances occurring due to manufacturing errors. In this embodiment, each of the first extending arms 132 has a first through hole 131, and the two first through holes 131 are substantially aligned with each other. Furthermore, the bottom end of the first supporting portion 134 of the first Y-shaped support 130 has a third concave hole 137.

When the first Y-shaped support 130 is assembled to the frame body 120, the first through hole 131 of the first extending arm 132 closest to the frame body 120 is first aligned with the first concave hole 123 of the frame body 120. Next, the first fixing element 140 is coupled to the first through hole 131 and the first concave hole 123 (e.g., passed through the first through hole 131 and engaged with the first concave hole 123). As a result, the first extending arms 132 of the first Y-shaped support 130 can be fixed to the first concave hole 123 of the frame body 120 by the first fixing element 140. Since the first Y-shaped support 130 has two substantially parallel first extending arms 132, a single first Y-shaped support 130 may be selectively connected to a single frame body 120 of a single solar panel 110 or connected between two adjacent frame bodies 120 of two adjacent solar panels 110.

Furthermore, the first Y-shaped support 130 further has a plurality of first protruding points 136. The first protruding points 136 are located on a periphery of the first through hole 131 of each of the two first extending arms 132, as well as on the bottom end surface 138 of the first supporting portion 134. Each of the first protruding points 136 may be pointed to facilitate grounding. When the first fixing element 140 is coupled to the first through hole 131 and the first concave hole 123, the first protruding points 136 can scrape an insulating layer (not shown) of the frame body 120 in contact with the first protruding points 136, such that the first Y-shaped support 130 is conducted with the frame body 120.

Figure 4:
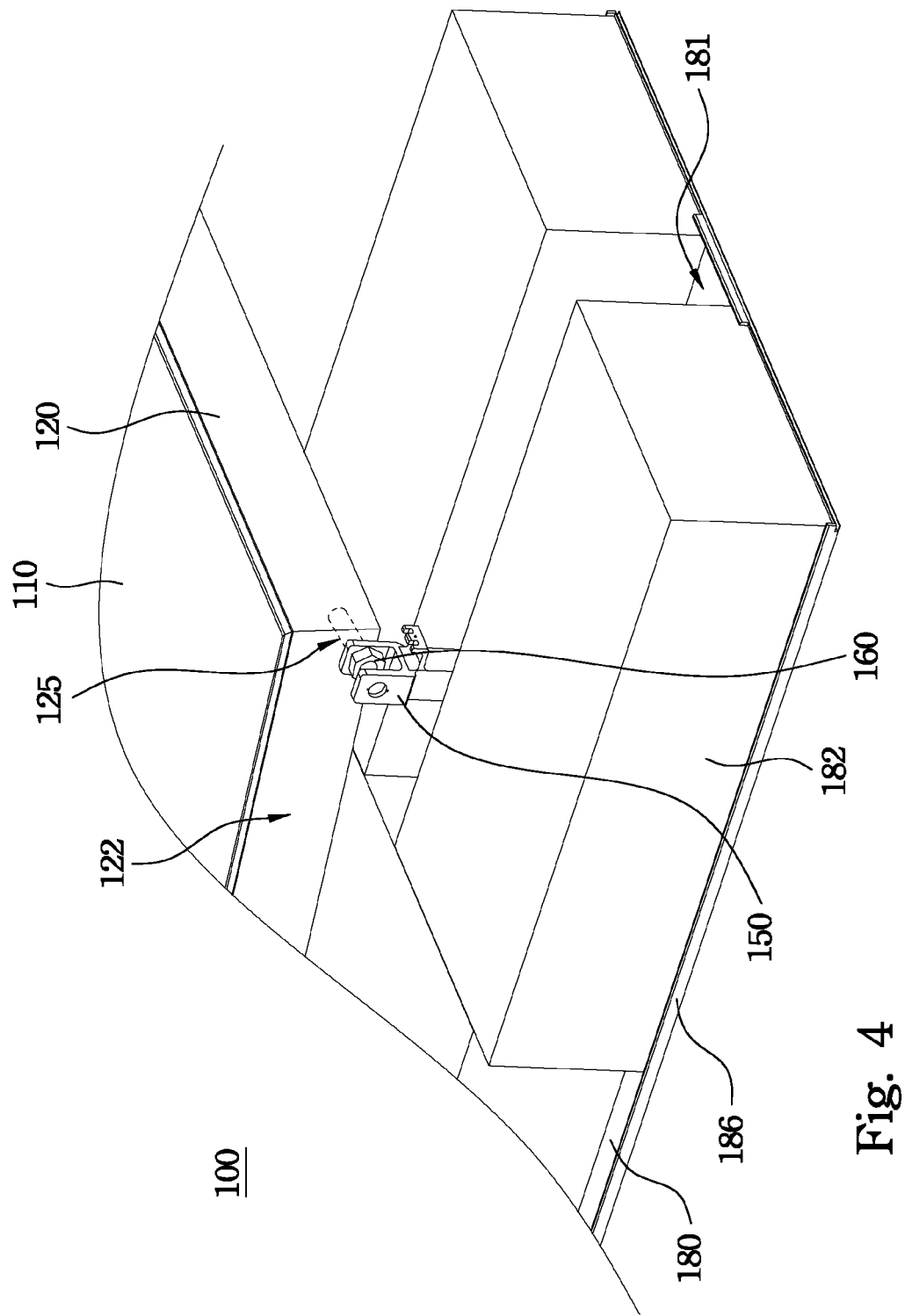
FIG. 4 is a partial enlarged view of the solar apparatus shown in FIG. 1.
Figure 5:
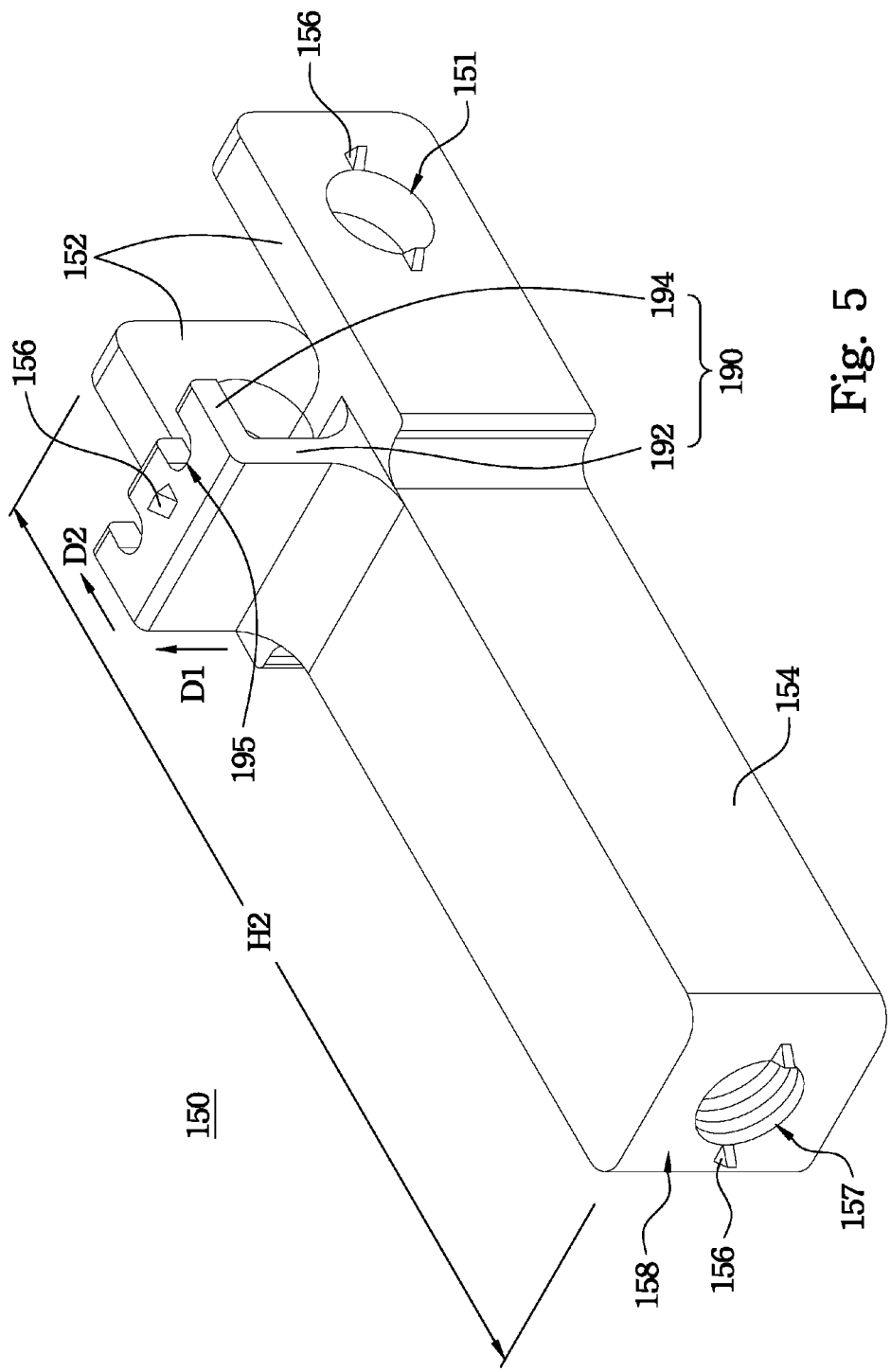
FIG. 5 is a perspective view of a second Y-shaped support shown in FIG. 4.

FIG. 4 is a partial enlarged view of the solar apparatus 100 shown in FIG. 1. FIG. 5 is a perspective view of the second Y-shaped support 150 shown in FIG. 4. As shown in FIG. 4 and FIG. 5, similar to the configuration described above, a side face 122 of the frame body 120 has a second concave hole 125. The second Y-shaped support 150 has two substantially parallel second extending arms 152 and a second supporting portion 154, and the second supporting portion 154 is connected to the two second extending arms 152. The second base plate 180 has a second surface 181. A bottom end surface 158 of the second supporting portion 154 of the first Y-shaped support 150 is connected to the second surface 181. The second surface 181 is used to support the pressing block 182. In this embodiment, each of the two second extending arms 152 has a second through hole 151, and the two second through holes 151 are substantially aligned with each other. Furthermore, the bottom end of the second supporting portion 154 of the second Y-shaped support 150 has a fourth concave hole 157.

When the second Y-shaped support 150 is assembled to the frame body 120, the second through hole 151 of the second extending arm 152 closest to the frame body 120 is first aligned with the second concave hole 125 of the frame body 120. Next, the second fixing element 160 is coupled to the second through hole 151 and the second concave hole 125 (e.g., passed through the second through hole 151 and engaged with the second concave hole 125). As a result, the second extending arms 152 of the second Y-shaped support 150 can be fixed to the second concave hole 125 of the frame body 120 by the second fixing element 160. Since the second Y-shaped support 150 has two substantially parallel second extending arms 152, a single second Y-shaped support 150 may be selectively connected to a single frame body 120 of a single solar panel 110 or connected between two adjacent frame bodies 120 of two adjacent solar panels 110. Each of the first fixing element 140 (see FIG. 2) and the second fixing element 160 may include a screw and a screw nut, and the first concave hole 123 (see FIG. 2) and the second concave hole 125 may be screw holes, but the present invention is not limited in this regard. For example, the first and second fixing elements 140, 160 may be bolts, and the first and second concave holes 123, 125 may be holes having no thread.

The difference between the first Y-shaped support 130 (see FIG. 3) and second Y-shaped support 150 is that the second Y-shaped support 150 further includes an L-shaped fixing base 190. The L-shaped fixing base 190 extends outward from the second supporting portion 154 and is adjacent to the two second extending arms 152. For example, the second supporting portion 154 may be a cuboid having four sides. When the two second extending arms 152 extend outward from two opposite sides of the second supporting portion 154, the L-shaped fixing base 190 extends outward from another side between the two opposite sides of the second supporting portion 154. The L-shaped fixing base 190 has a first board body 192 and a second board body 194, and the first board body 192 is connected to the second supporting portion 154 and the second board body 194. In other words, the first board body 192 extends outward from the second supporting portion 154, and the first board body 192 intersects the second board body 194. Furthermore, the second board body 194 and the two second extending arms 152 extend in the same direction D2.

Moreover, the second Y-shaped support 150 has a plurality of second protruding points 156. The second protruding points 156 are located on a periphery of the second through hole 151 of each of the two second extending arms 152, as well as on the bottom end surface 158 of the second supporting portion 154 and on the second board body 194. Each of the second protruding points 156 may be pointed to facilitate grounding. When the second fixing element 160 is coupled to the second through hole 151 and the second concave hole 125, the second protruding points 156 can scrape the insulating layer (not shown) of the frame body 120 in contact with the second protruding point 156, such that the second Y-shaped support 150 is conducted with the frame body 120.

As shown in FIG. 2 and FIG. 4, sides of the first and second base plates 170, 180 respectively have barricades 176, 186, and the barricades 176, 186 are respectively substantially perpendicular to the first and second surfaces 171, 181. When the solar apparatus 100 is subjected to an external force (e.g., vibrations resulting from an earthquake or wind), the barricades 176, 186 can prevent the pressing blocks 172, 182 from being displaced too much, such that the first and second base plates 170, 180 can be steadily positioned on the support surface 300 (see FIG. 1).

Referring to FIG. 1, the solar apparatus 100 can be easily assembled and disassembled without the use of many tools and connection structures. Furthermore, the first and second Y-shaped supports 130, 150 are easily packaged for transport, and can be connected to frame bodies 120 of different types of solar cells, as long as the side face 122 of the frame body 120 has the first and second concave holes 123, 125, or holes having no thread. As a result, when the solar apparatus 100 is used, assembly time and disassembly time can be reduced, as can material and labor costs.

Furthermore, the frame body 120 may be made of a material that includes gold, silver, copper, iron, aluminum or other conductive metals. The first and second protruding points 136, 156 (see FIG. 3 and FIG. 5) of the first and second Y-shaped supports 130, 150 can scrape the insulating layer (not shown) of the frame body 120 in contact with the first and second protruding points 136, 156, such that the solar panel 110 can be grounded. Through such a configuration, conventional conductive wires for grounding are unneeded.

It is to be noted that the aforementioned elements and the connection relationship of the elements will not be repeated. In the following description, other types of the first and second Y-shaped supports 130, 150 will be described.

Figure 6:
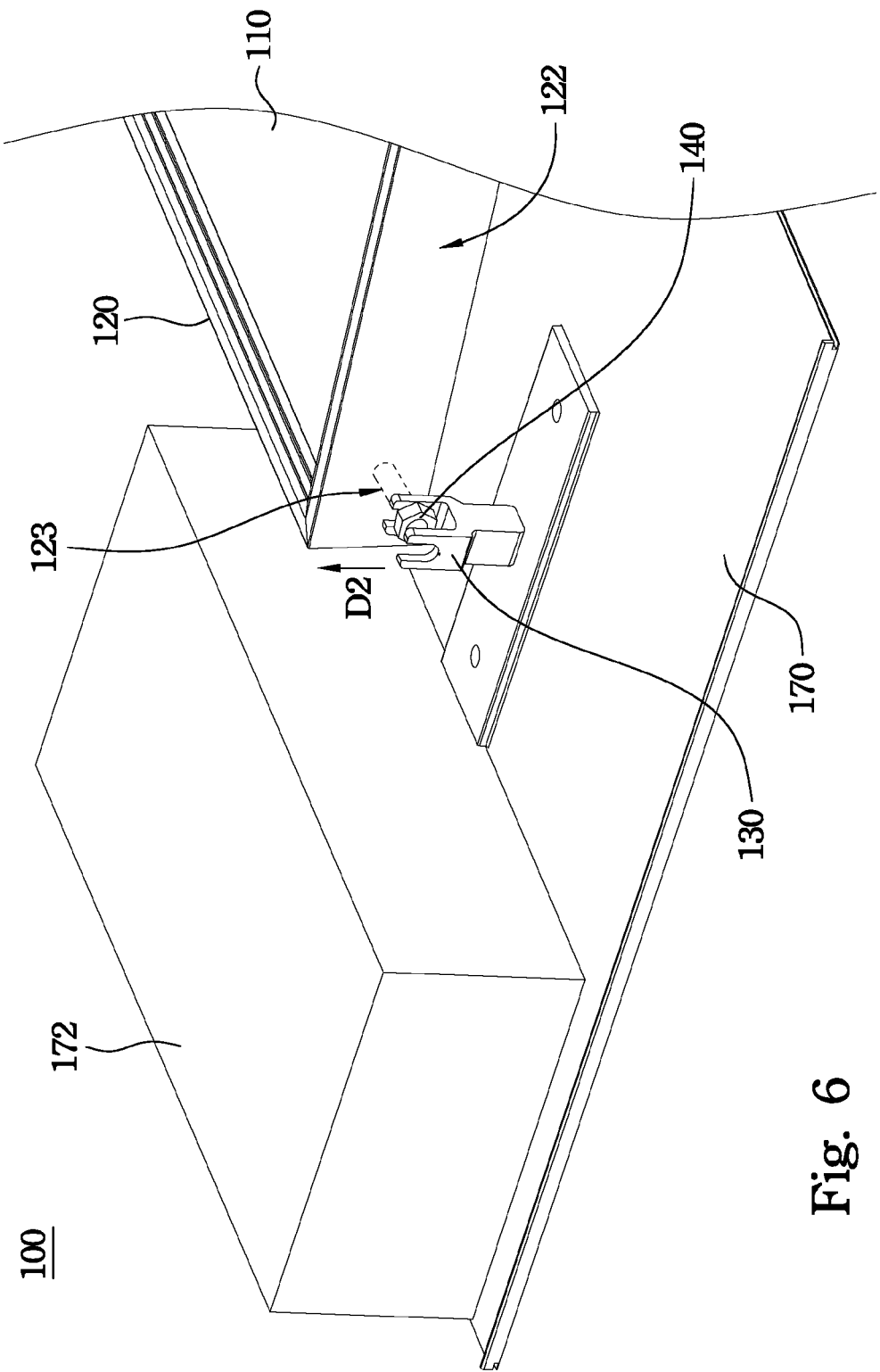
FIG. 6 is another embodiment of the solar apparatus shown in FIG. 2.
Figure 7:
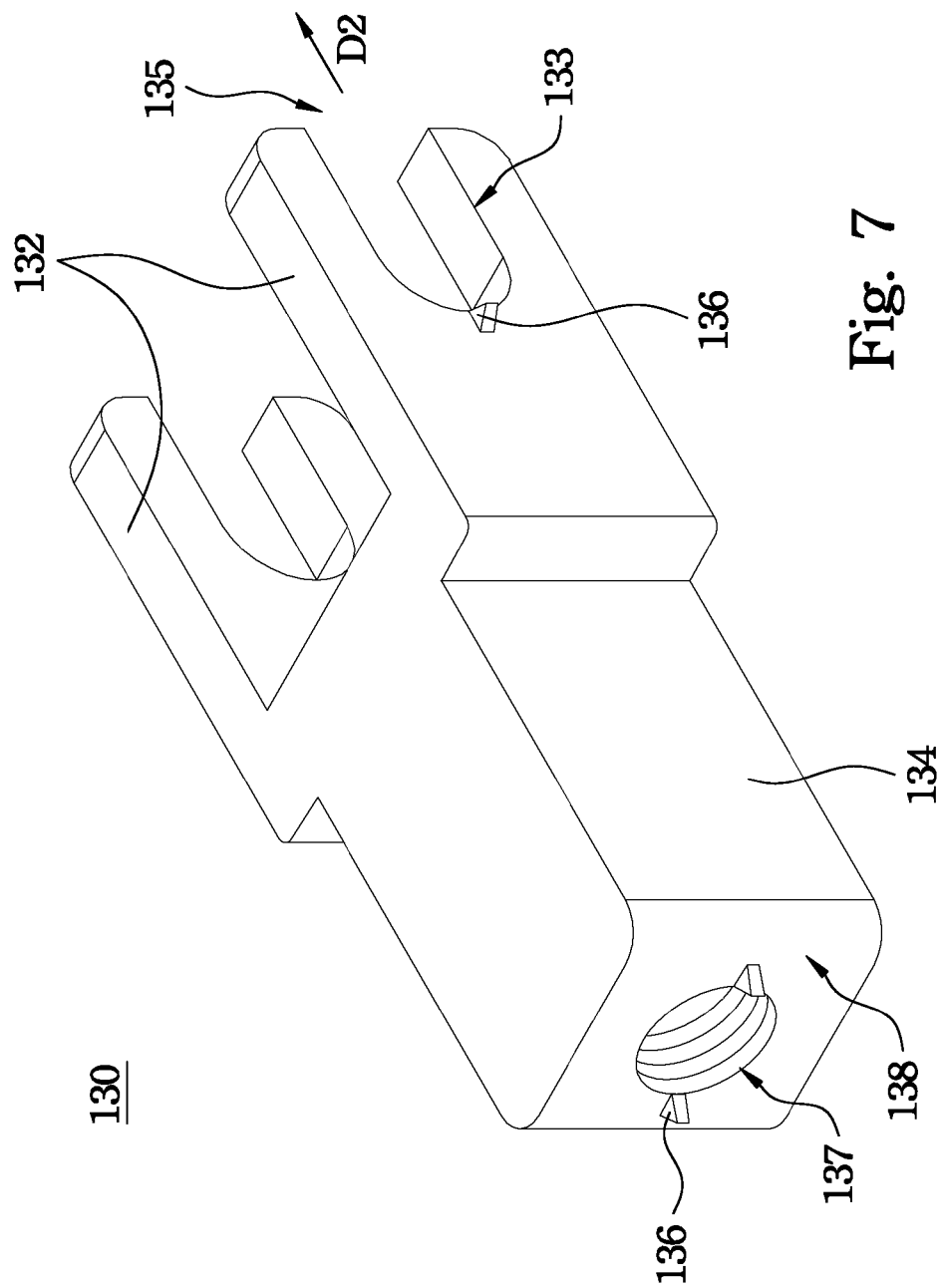
FIG. 7 is a perspective view of a first Y-shaped support shown in FIG. 6.

FIG. 6 is another embodiment of the solar apparatus 100 shown in FIG. 2. FIG. 7 is a perspective view of the first Y-shaped support 130 shown in FIG. 6. As shown in FIG. 6 and FIG. 7, the first Y-shaped support 130 has the two substantially parallel first extending arms 132 and the first supporting portion 134 connected to the first extending arms 132. The difference between this embodiment and the embodiment shown in FIG. 3 is that each of the two first extending arms 132 of this embodiment has a first cavity 133. Each of the two first cavities 133 has an upward (in the direction D2) opening 135, and the two first cavities 133 are substantially aligned with each other. Therefore, each of the first extending arms 132 is formed as a U-shaped extending arm.

When the first Y-shaped support 130 is assembled to the frame body 120, the first cavity 133 of the first extending arm 132 closest to the frame body 120 is first aligned with the first concave hole 123 of the frame body 120. Next, the first fixing element 140 is coupled to the first cavity 133 and the first concave hole 123 (e.g., passed through the first cavity 133 and engaged with the first concave hole 123). As a result, the first extending arms 132 of the first Y-shaped support 130 can be fixed to the first concave hole 123 of the frame body 120 by the first fixing element 140. Alternatively, in this embodiment, the first fixing element 140 may first be coupled to the first concave hole 123 of the frame body 120. Next, the first fixing element 140 can be placed in the first cavity 133 via the opening 135 of the first Y-shaped support 130. As in the case of the embodiment described above, since the first Y-shaped support 130 has the two substantially parallel first extending arms 132, a single first Y-shaped support 130 may be selectively connected to a single frame body 120 of a single solar panel 110 or connected between two adjacent frame bodies 120 of two adjacent solar panels 110.

Figure 8:
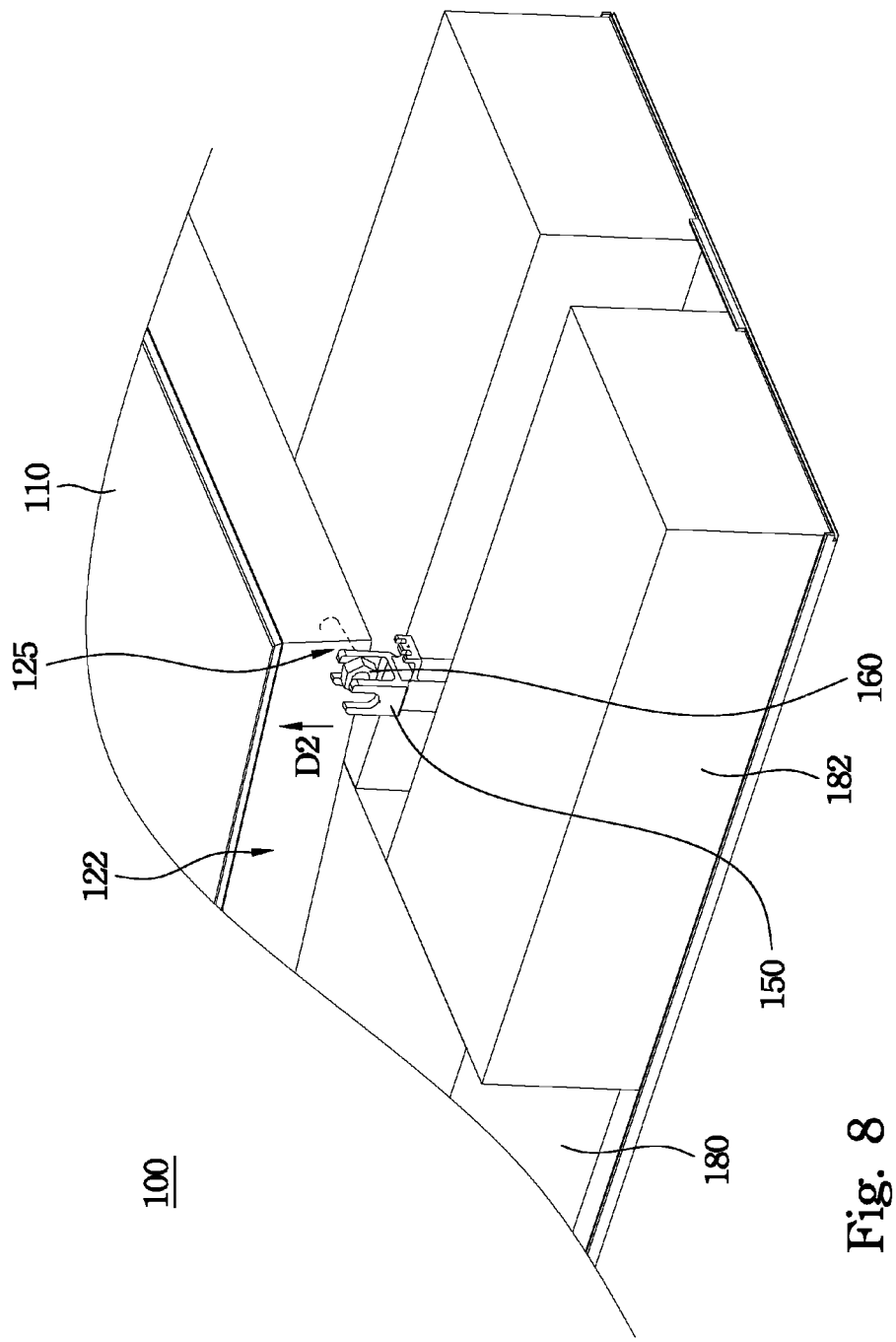
FIG. 8 is another embodiment of the solar apparatus shown in FIG. 4.
Figure 9:
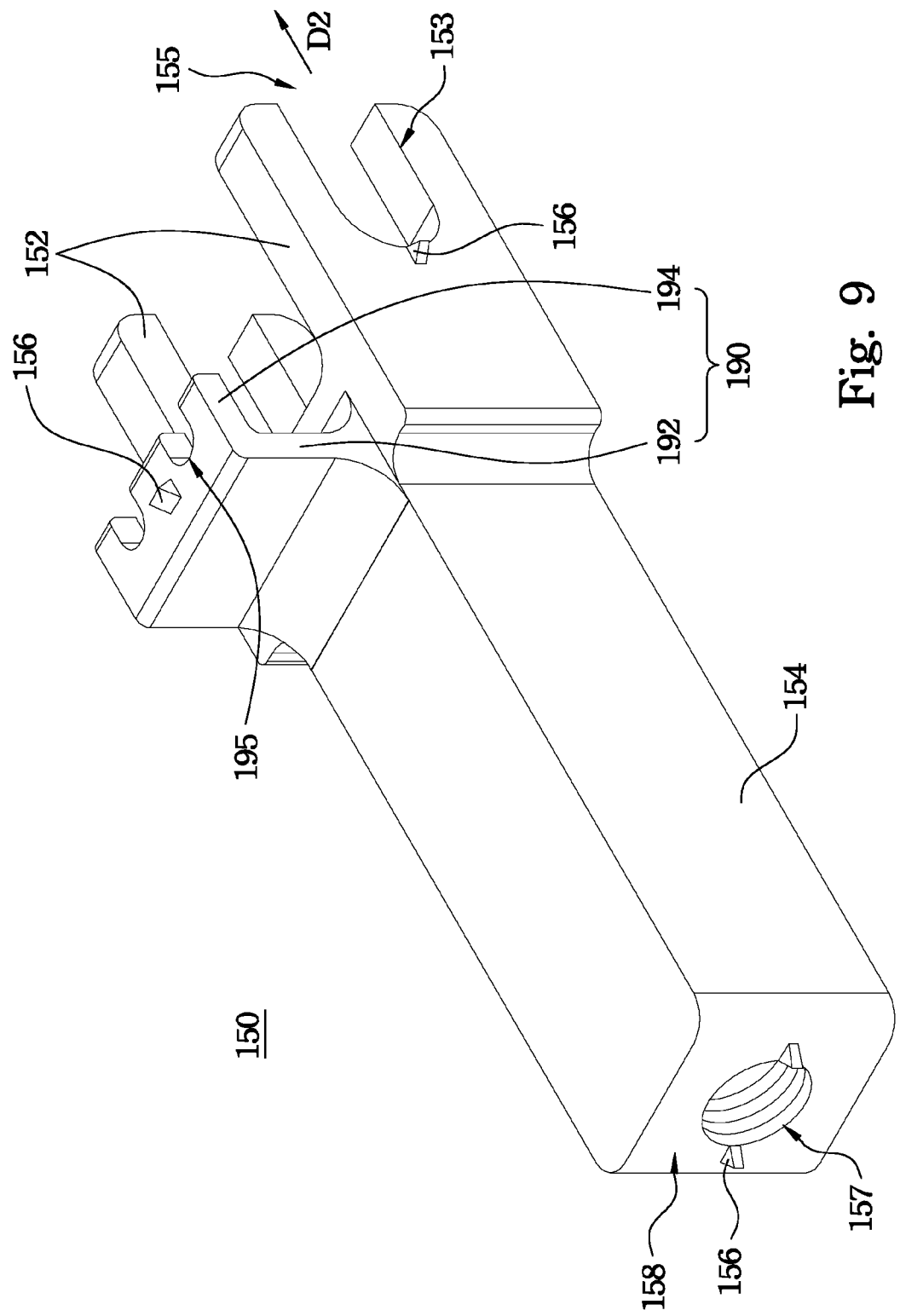
FIG. 9 is a perspective view of a second Y-shaped support shown in FIG. 8.

FIG. 8 is another embodiment of the solar apparatus 100 shown in FIG. 4. FIG. 9 is a perspective view of the second Y-shaped support 150 shown in FIG. 9. As shown in FIG. 8 and FIG. 9, the second Y-shaped support 150 has the two substantially parallel second extending arms 152 and the second supporting portion 154 connected to the second extending arms 152. The difference between this embodiment and the embodiment shown in FIG. 5 is that each of the two second extending arms 152 of this embodiment has a second cavity 153. Each of the two second cavities 153 has an upward (in the direction D2) opening 155, and the two second cavities 153 are substantially aligned with each other. Therefore, each of the second extending arms 152 is formed as a U-shaped extending arm.

When the second Y-shaped support 150 is assembled to the frame body 120, the second cavity 153 of the first extending arm 132 closest to the frame body 120 is first aligned with the second concave hole 125 of the frame body 120. Next, the second fixing element 160 is coupled to the second cavity 153 and the second concave hole 125 (e.g., passed through the second cavity 153 and engaged with the second concave hole 125). As a result, the second extending arms 152 of the second Y-shaped support 150 can be fixed to the second concave hole 125 of the frame body 120 by the second fixing element 160. Alternatively, in this embodiment, the second fixing element 160 may first be coupled to the second concave hole 125 of the frame body 120. Next, the second fixing element 160 can be placed in the second cavity 153 via the opening 155 of the second Y-shaped support 150. As in the case of the embodiments described above, since the second Y-shaped support 150 has the two substantially parallel second extending arms 152, a single second Y-shaped support 150 may be selectively connected to a single frame body 120 of a single solar panel 110 or connected between two adjacent frame bodies 120 of two adjacent solar panels 110.

It is to be noted that the aforementioned elements and the connection relationship of the elements will not be repeated. In the following description, other structures of the solar apparatus 100 will be described.

Figure 10:
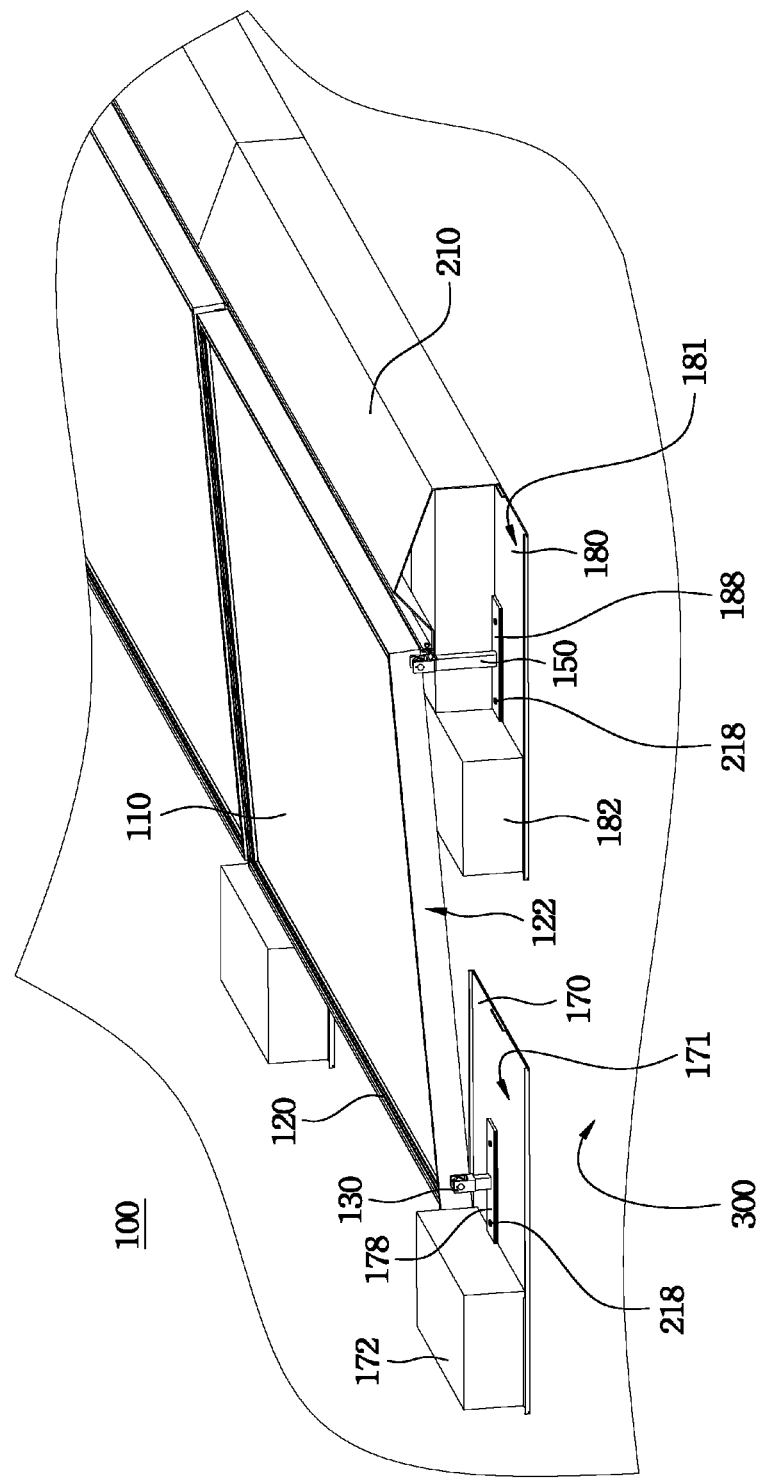
FIG. 10 is a perspective view of a solar apparatus according to an embodiment of the present invention.
Figure 11:
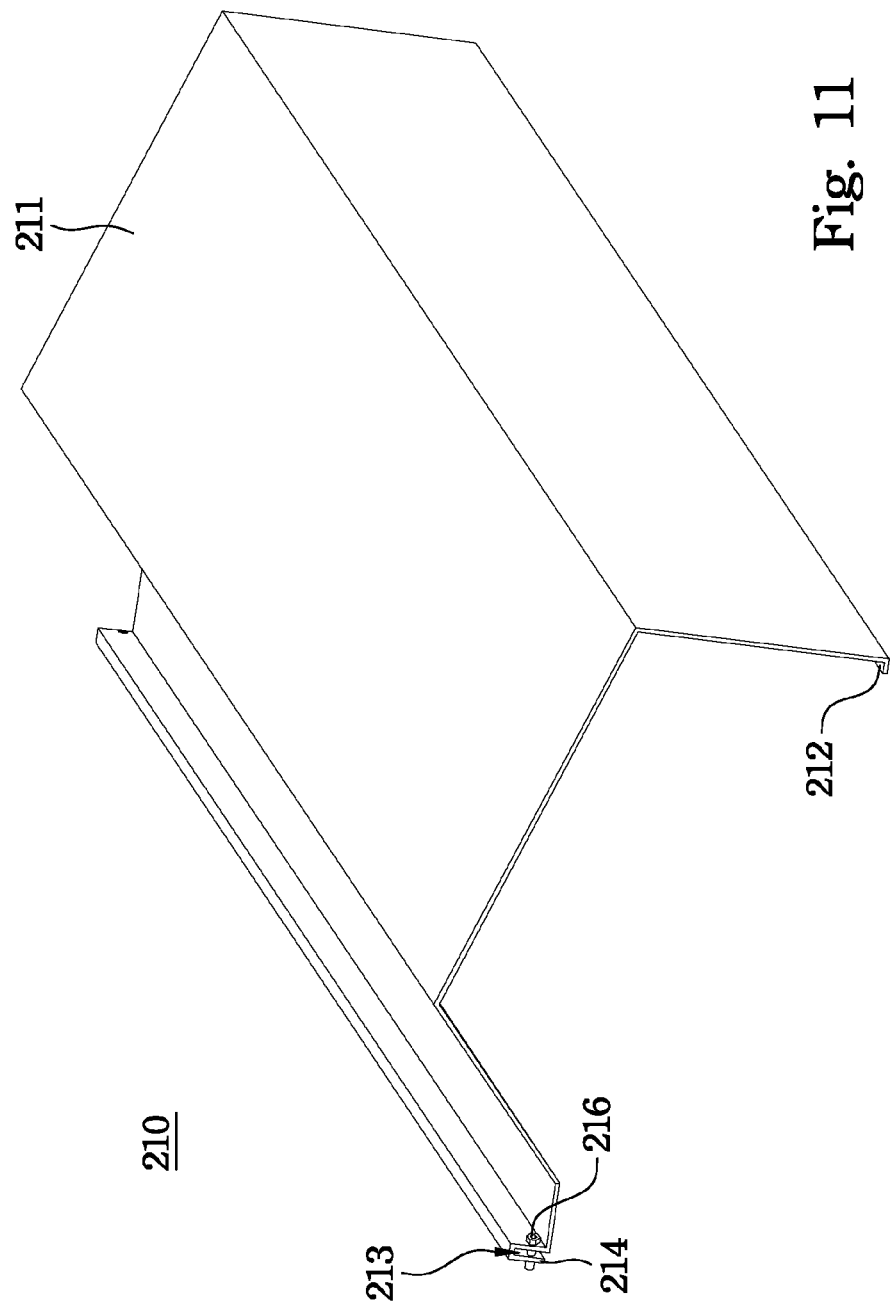
FIG. 11 is a partial enlarged perspective view of a windshield board shown in FIG. 10.

FIG. 10 is a perspective view of a solar apparatus 100 according to an embodiment of the present invention. FIG. 11 is a partial enlarged perspective view of a windshield board 210 shown in FIG. 10. As shown in FIG. 10 and FIG. 11, the difference between this embodiment and the embodiment shown in FIG. 1 is that the solar apparatus 100 of this embodiment further includes the windshield board 210 connected between the second Y-shaped support 150 and the second base plate 180. The windshield board 210 has a windshield portion 211, and a first end portion 212 and a second end portion 214 disposed respectively on two opposite ends of the windshield portion 211. The first end portion 212 may be selectively abutted against the support surface 300 (e.g., a ground surface) or coupled to the second base plate 180 (to be described hereinafter), and the second end portion 214 has a fastening groove 213. Furthermore, the windshield board 210 may include a bolt 216.

Figure 12:
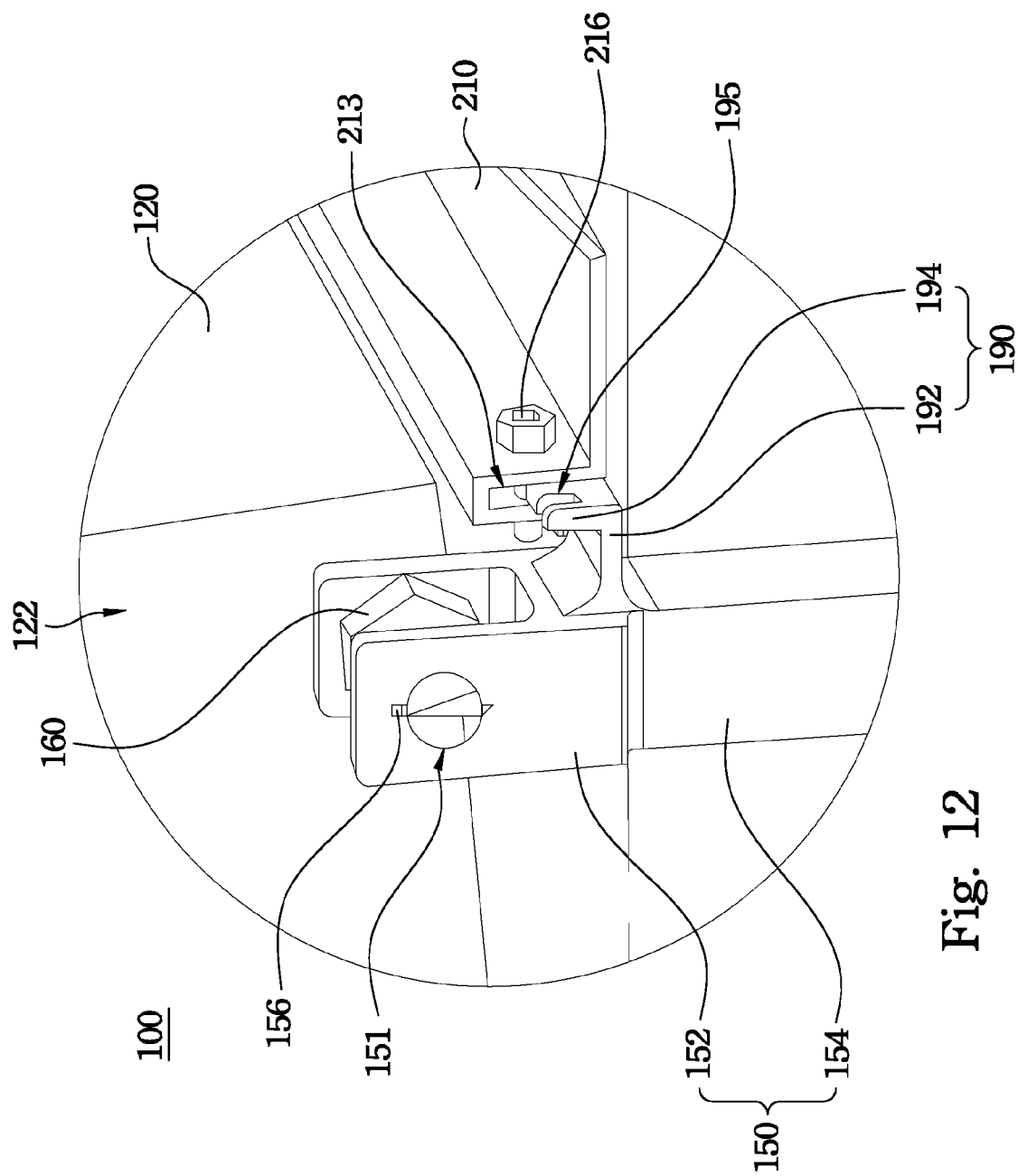
FIG. 12 is a partial enlarged view of the solar apparatus shown in FIG. 10.

FIG. 12 is a partial enlarged view of the solar apparatus 100 shown in FIG. 10. As shown in FIG. 5 and FIG. 12, the second end portion 214 of the windshield board 210 may be coupled to the L-shaped fixing base 190 through the fastening groove 213 of the second end portion 214. In this embodiment, the second board body 194 of the L-shaped fixing base 190 has a plurality of third cavities 195. The bolt 216 of the windshield board 210 is fixed on the second end portion 214 of the windshield board 210 and extends through the fastening groove 213 of the same. When the fastening groove 213 of the windshield board 210 is engaged with the L-shaped fixing base 190 of the second Y-shaped support 150, the bolt 216 can be coupled to one of the third cavities 195 of the second board body 194 (i.e., passed through one of the third cavities 195 of the second board body 194). During assembly of the windshield board 210, the bolt 216 that extends through the fastening groove 213 may be placed in one of the third cavities 195 of the second board body 194, such that the second end portion 214 (see FIG. 11) of the windshield board 210 is positioned on the L-shaped fixing base 190 of the second Y-shaped support 150. Moreover, when the bolt 216 is coupled to one of the third cavities 195 of the second board body 194 in this manner, the second protruding point 156 located on the second board body 194 can scrape an insulating layer (not shown) of the windshield board 210 in contact with the second protruding point 156. Therefore, the second Y-shaped support 150 can be conducted with the windshield board 210.

In this embodiment, the second Y-shaped support 150 is of the same type as that of the second Y-shaped support 150 shown in FIG. 5. However, in another embodiment, the second Y-shaped support 150 may be of the type shown in FIG. 9, and the present invention is not limited in this regard.

Figure 13:
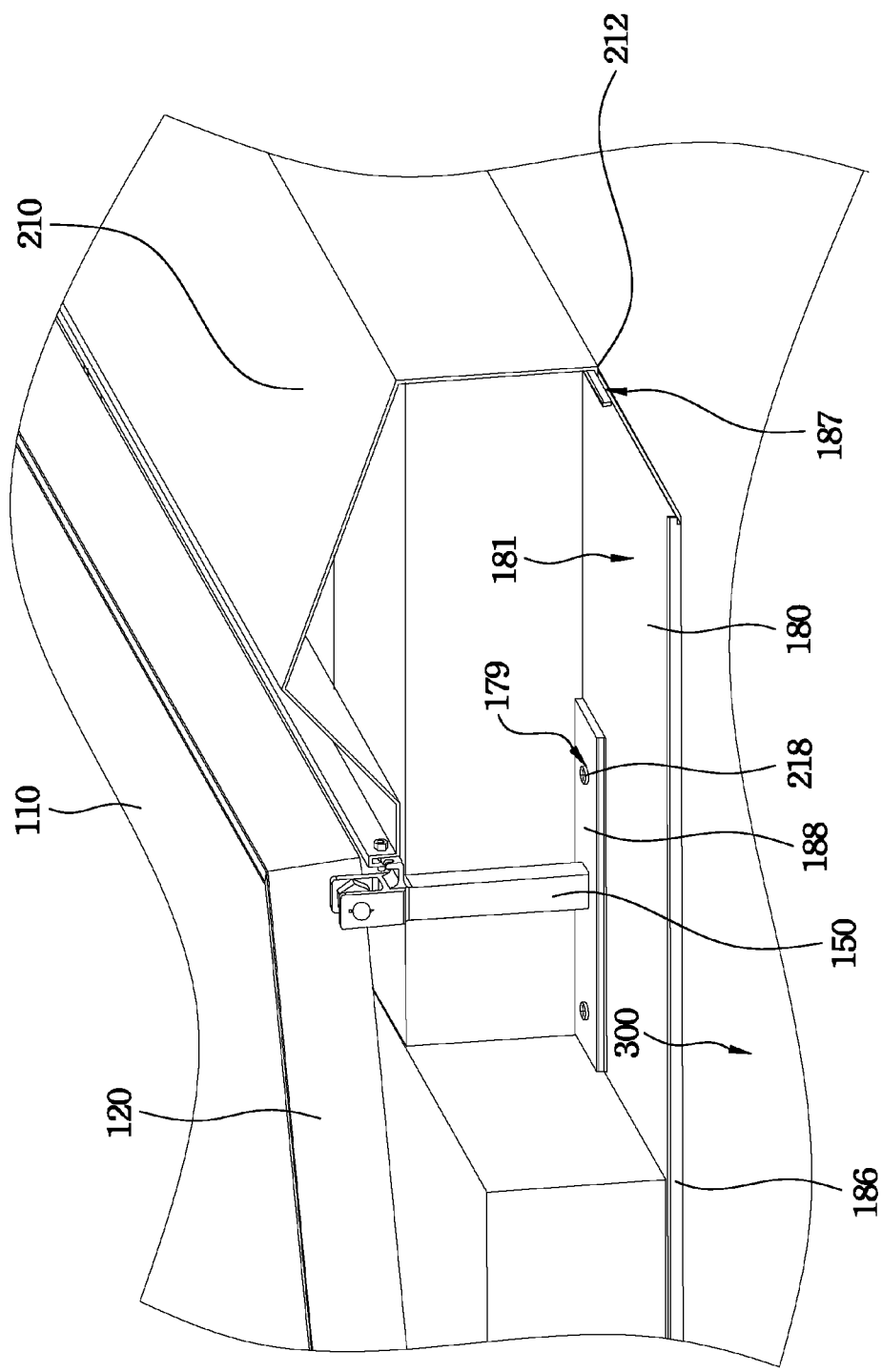
FIG. 13 is a partial enlarged view of the solar apparatus shown in FIG. 10.

FIG. 13 is a partial enlarged view of the solar apparatus 100 shown in FIG. 10. As shown in FIG. 10 and FIG. 13, the first and second surfaces 171, 181 respectively have protruding blocks 178, 188. The protruding blocks 178, 188 are respectively connected to the bottom end surface 138 of the first supporting portion 134 (see FIG. 3) of the first Y-shaped support 130 and the bottom end surface 158 of the second supporting portion 154 (see FIG. 5) of the second Y-shaped support 150. The first and second base plates 170, 180 may be fastened on the support surface 300 by the screws 218 or adhered on the support surface 300 by an adhesive, as described above. In this embodiment, each of the first and second base plates 170, 180 has the fixing hole 179, such that the screw 218 can be extended through the fixing hole 179 and engaged with a screw hole (not shown) in the support surface 300. As a result, the solar apparatus 100 does not easily undergo displacement when subjected to an external force. Furthermore, a side of the second surface 181 of the second base plate 180 has a groove 187 for receiving the first end portion 212 of the windshield board 210.

Figure 14:
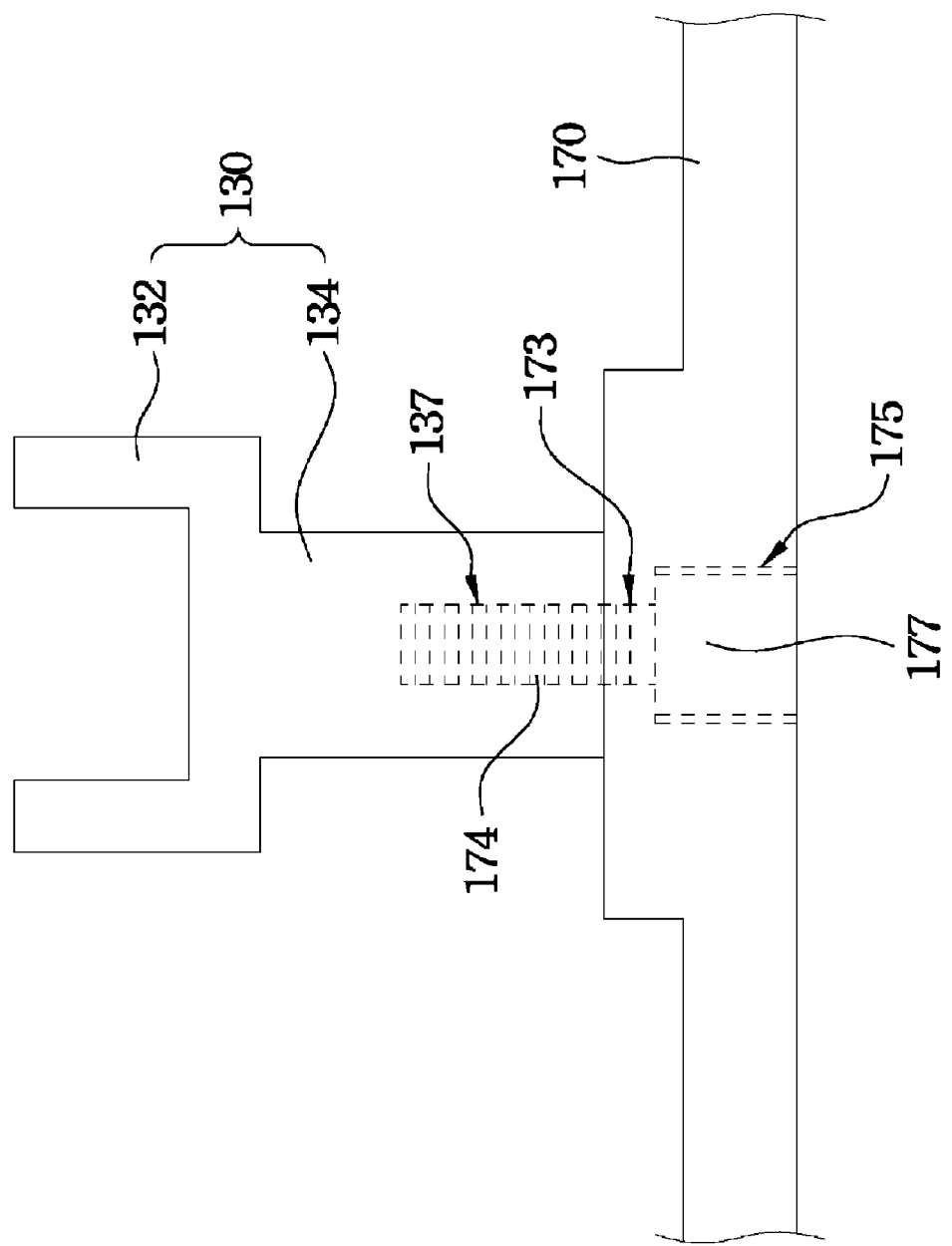
FIG. 14 is a schematic view of the first Y-shaped support shown in FIG. 1 and FIG. 10 when assembled to a first base plate.

FIG. 14 is a schematic view of the first Y-shaped support 130 shown in FIG. 1 and FIG. 10 when assembled to the first base plate 170. FIG. 15 is a schematic view of the second Y-shaped support 150 shown in FIG. 1 and FIG. 10 when assembled to the second base plate 180. As shown in FIGS. 3, 5, 13, and 14, the bottom end surface 138 of the first supporting portion 134 of the first Y-shaped support 130 has the third concave hole 137, and the bottom end surface 158 of the second supporting portion 154 of the second Y-shaped support 150 has the fourth concave hole 157. Moreover, the first base plate 170 has a third through hole 173 and a first accommodating portion 175. The second base plate 180 has a fourth through hole 183 and a second accommodating portion 185. The first base plate 170 includes a third fixing element 174 coupled to the third concave hole 137 and the third through hole 173, such that the first Y-shaped support 130 can be fixed on the first base plate 170. The second base plate 180 includes a fourth fixing element 184 coupled to the fourth concave hole 157 and the fourth through hole 183, such that the second Y-shaped support 150 can be fixed on the second base plate 180.

Furthermore, the first base plate 170 has the first accommodating portion 175 spatially communicated with the third through hole 173, and the first accommodating portion 175 accommodates an end portion 177 of the third fixing element 174. The third fixing element 174 is inserted into the third concave hole 137 of the first Y-shaped support 130. The second base plate 180 has the second accommodating portion 185 spatially communicated with the fourth through hole 183, and the second accommodating portion 185 accommodates an end portion 189 of the fourth fixing element 184. The fourth fixing element 184 is inserted into the fourth concave hole 157 of the second Y-shaped support 150.

As a result, since the end portion 177 of the third fixing element 174 and the end portion 189 of the fourth fixing element 184 do not respectively protrude from the first and second base plates 170, 180, the first and second base plates 170, 180 can be securely positioned on the support surface 300 (see FIG. 10), and are not obliquely located on the support surface 300. In this embodiment, the third and fourth fixing elements 174, 184 may be screws, and the third and fourth concave holes 137, 157 may be screw holes, but the present invention is not limited in this regard.

Furthermore, at least one of the first protruding points 136 is adjacent to the third concave hole 137, and at least one of the second protruding points 156 is adjacent to the fourth concave hole 157. When the third and fourth fixing elements 174, 184 are respectively coupled to the third and fourth concave holes 137, 157 of the first and second Y-shaped supports 130, 150, the first protruding point 136 located on the surface 138 and the second protruding point 156 located on the surface 158 can respectively scrape insulating layers (not shown) of the first and second base plates 170, 180 in contact with the first and second protruding points 136, 156, such that the first and second Y-shaped supports 130, 150 can be conducted with first and second base plates 170, 180 to facilitate grounding of the solar panel 110.

Referring to FIG. 10, the first and second protruding points 136, 156 (see FIG. 3 and FIG. 5) of the first and second Y-shaped supports 130, 150 can scrape the insulating layers of the frame body 120, and the windshield board 210, the first and second base plates 170, 180 in contact with the first and second protruding points 136, 156, such that solar panel 110 can be grounded. Therefore, conventional conductive wires for grounding are unneeded.

FIG. 16 is a bottom view of the first Y-shaped support 130 shown in FIG. 14 when assembled to the first base plate 170. As shown in FIG. 14 and FIG. 16, a contour of the first accommodating portion 175 is the same as a contour of the end portion 177 of the third fixing element 174. When the first Y-shaped support 130 is assembled to the first base plate 170, as long as the third fixing element 174 is passed through the third through hole 173, the end portion 177 of the third fixing element 174 is coupled to the first accommodating portion 175. The third fixing element 174 can then be coupled to the third concave hole 137 by rotating the first supporting portion 134 of the first Y-shaped support 130 relative to the third fixing element 174. Therefore, the first Y-shaped support 130 can be fixed on the first base plate 170 without the need for additional tools. Moreover, the second Y-shaped support 150 shown in FIG. 15 can also be assembled to the second base plate 180 in a similar manner.

Compared with a conventional solar assembly, the first extending arm of the first Y-shaped support can be fixed on the first concave hole of the frame body by the first fixing element, and the second extending arm of the second Y-shaped support can be fixed on the second concave hole of the frame body by the second fixing element, so that the solar panel located in the frame body can be easily supported by the first and second Y-shaped supports. The first protruding points of the first Y-shaped support can scrape the surface insulation layers of the frame body and the first base plate, and the second protruding points of the second Y-shaped support can scrape the surface insulation layers of the frame body, the second base plate, and the windshield board, such that the solar cell is grounded. Therefore, conventional grounding conductive wires are unneeded. Furthermore, the bolt of the windshield board is connected extending through the fastening groove of the windshield board. When the fastening groove is engaged with the L-shaped fixing base of the second Y-shaped support, the bolt can be coupled to the third cavity of the second board body of the L-shaped fixing base, such that the second end portion of the windshield board is positioned on the L-shaped fixing base of the second Y-shaped support.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A solar apparatus comprising:
   a solar panel;
   a frame body surrounding an edge of the solar panel;
   a first Y-shaped support having two parallel first extending arms and a first supporting portion, wherein the first supporting portion is connected to the two first extending arms, and one of the two first extending arms is fixed on a side of the frame body; and
   a second Y-shaped support having two parallel second extending arms and a second supporting portion, wherein the second supporting portion is connected to the two second extending arms, one of the two second extending arms is fixed on the side of the frame body, and a height of the first Y-shaped support is smaller than a height of the second Y-shaped support, and the second Y-shaped support further comprises:
   an L-shaped fixing base extending outward from the second supporting portion, wherein the L-shaped fixing base has a first board body and a second board body, the first board body intersects the second board body, and the second board body and the two second extending arms extend in the same direction.

2. The solar apparatus as claimed in claim 1, wherein each of the two first extending arms has a first cavity, each of the two second extending arms has a second cavity, each of the first and second cavities has an upward opening, and each of the first and second cavities is coupled with a fixing element, such that the first and second extending arms are fixed on the frame body.

3. The solar apparatus as claimed in claim 1, wherein each of the two first extending arms has a first through hole, each of the two second extending arms has a second through hole, and each of the first and second through holes is coupled with a fixing element, such that the first and second extending arms are fixed on the frame body.

4. The solar apparatus as claimed in claim 3, wherein the first Y-shaped support has a plurality of first protruding points, and the first protruding points are located on a periphery of the first through hole of each of the two first extending arms and on a bottom end surface of the first supporting portion.

5. The solar apparatus as claimed in claim 1, wherein the second Y-shaped support has a plurality of second protruding points, and the second protruding points are located on a periphery of the second through hole of each of the two second extending arms, as well as on a bottom end surface of the second supporting portion and on the second board body.

6. The solar apparatus as claimed in claim 1, further comprising:
a first base plate for fixing the first Y-shaped support thereon; and
a second base plate for fixing the second Y-shaped support thereon.

7. The solar apparatus as claimed in claim 6, further comprising:
a windshield board having a windshield portion, and a first end portion and a second end portion disposed respectively on two opposite ends of the windshield portion, wherein the first end portion is coupled to the second base plate, and the second end portion has a fastening groove engaged with the L-shaped fixing base.

8. The solar apparatus as claimed in claim 6, wherein a bottom end of the first supporting portion of the first Y-shaped support has a concave hole, the first base plate has a through hole, and the first Y-shaped support is fixed on the first base plate by a fixing element coupled to the through hole and the concave hole.

9. The solar apparatus as claimed in claim 8, wherein a bottom portion of the first base plate has an accommodating portion spatially communicated with the through hole for accommodating an end portion of the fixing element, and a contour of the accommodating portion is the same as a contour of the end portion of the fixing element.

10. The solar apparatus as claimed in claim 6, wherein a bottom end of the second supporting portion of the second Y-shaped support has a concave hole, the second base plate has a through hole, and the second Y-shaped support is fixed on the second base plate by a fixing element coupled to the through hole and the concave hole.

11. The solar apparatus as claimed in claim 10, wherein a bottom portion of the second base plate has an accommodating portion spatially communicated with the through hole for accommodating an end portion of the fixing element, and a contour of the accommodating portion is the same as a contour of the end portion of the fixing element.

12. A solar mounting system suitable for supporting a solar module, comprising:
a first Y-shaped support having two parallel first extending arms and a first supporting portion, wherein the first supporting portion is connected to the two first extending arms, and one of the two first extending arms is fixed to the solar module;
a first base plate on which is fixed the first Y-shaped support;
a second Y-shaped support having two parallel second extending arms and a second supporting portion, wherein the second supporting portion is connected to the two second extending arms, one of the two second extending arms is fixed to the solar module, and a height of the first Y-shaped support is smaller than a height of the second Y-shaped support, and the second Y-shaped support further comprises:
an L-shaped fixing base extending outward from the second supporting portion, wherein the L-shaped fixing base has a first board body and a second board body, the first board body intersects the second board body, and the second board body and the two second extending arms extend in the same direction; and
a second base plate on which is fixed the second Y-shaped support.

13. The solar mounting system as claimed in claim 12, wherein each of the two first extending arms has a first cavity, each of the two second extending arms has a second cavity, each of the first and second cavities has an upward opening, and each of the first and second cavities is coupled with a fixing element, such that the first and second extending arms are fixed on the solar module.

14. The solar mounting system as claimed in claim 12, wherein each of the two first extending arms has a first through hole, each of the two second extending arms has a second through hole, and each of the first and second through holes is coupled with a fixing element, such that the first and second extending arms are fixed on the frame body.

15. The solar mounting system as claimed in claim 12, wherein the first Y-shaped support has a plurality of first protruding points, and the first protruding points are located on two external sides of the two first extending arms and a bottom end surface of the first supporting portion.

16. The solar mounting system as claimed in claim 12, wherein the second Y-shaped support has a plurality of second protruding points, and the second protruding points are located on two external sides of the two second extending arms, a bottom end surface of the second supporting portion, and the second board body.

17. The solar mounting system as claimed in claim 12, wherein a bottom end of the first supporting portion of the first Y-shaped support has a concave hole, the first base plate has a through hole, and the first Y-shaped support is fixed on the first base plate by a fixing element coupled to the through hole and the concave hole.

18. The solar apparatus as claimed in claim 12, wherein a bottom end of the second supporting portion of the second Y-shaped support has a concave hole, the second base plate has a through hole, and the second Y-shaped support is fixed on the second base plate by a fixing element coupled to the through hole and the concave hole.

* * * * *